US010574372B1

(12) United States Patent
Nair et al.

(10) Patent No.: US 10,574,372 B1
(45) Date of Patent: Feb. 25, 2020

(54) SYSTEM AND METHOD FOR REDUCING THE SERVICE SWITCHING TIME BETWEEN FREQUENCIES IN A DIGITAL RADIO

(71) Applicant: INNTOT TECHNOLOGIES PRIVATE LIMITED, Kerala (IN)

(72) Inventors: Rajith Raman Pillai Indusekharan Nair, Kochi (IN); Prasanth Padmalayam Thankappan, Kerala (IN); Abdul Sameeh Parangodath, Kerala (IN); Aswin Karayee, Kerala (IN)

(73) Assignee: INNTOT TECHNOLOGIES PRIVATE LIMITED, Kerala (IN)

( * ) Notice: Subject to any disclaimer, the term of this patent is extended or adjusted under 35 U.S.C. 154(b) by 0 days.

(21) Appl. No.: 16/214,975

(22) Filed: Dec. 10, 2018

(30) Foreign Application Priority Data

Nov. 22, 2018 (IN) ............................ 201841044122

(51) Int. Cl.
*H04H 20/26* (2008.01)
*H04H 20/47* (2008.01)
(Continued)

(52) U.S. Cl.
CPC ............ *H04H 20/26* (2013.01); *H04H 20/28* (2013.01); *H04H 20/47* (2013.01); *H04L 27/2649* (2013.01); *H04H 2201/12* (2013.01)

(58) Field of Classification Search
CPC . H04H 2201/20; H04H 2201/12; H04H 20/26
See application file for complete search history.

(56) References Cited

U.S. PATENT DOCUMENTS 6,041,222 A 3/2000 Horton et al.
6,424,826 B1 7/2002 Horton et al.
(Continued)

FOREIGN PATENT DOCUMENTS

GB 2513892 A 11/2014
JP 4287042 B2 10/2001

OTHER PUBLICATIONS

Office Action for related Indian Patent Application No. 201841044122 dated Apr. 16, 2019.

*Primary Examiner* — Keith Ferguson
(74) *Attorney, Agent, or Firm* — Millen, White, Zelano & Branigan, P.C.; William Nixon

(57) ABSTRACT

A system and method enhance the user experience in a digital radio by reducing the service switching time between frequencies. The system includes a digital radio transmitter to transmit digital data in a digital radio broadcast standard. The digital radio transmitter includes a first service channel to carry basic service selection information and a second service channel to carry information required for decoding. The digital radio transmitter includes a main service channel to transmit digital audio services and data services. A central server stores information channel data of all digital radio stations. A digital radio receiver stores the first service channel and the second service channel information of all frequencies other than the currently tuned frequency to the receiver internal storage and uses the stored information for demodulating and decoding at the time of service switching between frequencies.

11 Claims, 5 Drawing Sheets

(51) Int. Cl.

| | |
|---|---|
| ***H04L 27/26*** | (2006.01) |
| ***H04H 20/28*** | (2008.01) |

(56) References Cited

U.S. PATENT DOCUMENTS

| | | | | |
|---|---|---|---|---|
| 7,950,042 | B2 | 5/2011 | Yousef | |
| 8,161,507 | B2 | 4/2012 | Shin et al. | |
| 9,065,577 | B2 | 6/2015 | Griffin et al. | |
| 2008/0144710 | A1* | 6/2008 | Becker | H04H 40/00 375/240 |
| 2009/0113300 | A1* | 4/2009 | Tuli | H04M 1/72522 715/716 |
| 2009/0141697 | A1* | 6/2009 | Hofmann | H04H 20/18 370/345 |
| 2014/0334578 | A1* | 11/2014 | Griffin | H04H 60/43 375/343 |

* cited by examiner

FIG. 1 shows the block diagram of the system of the present invention.
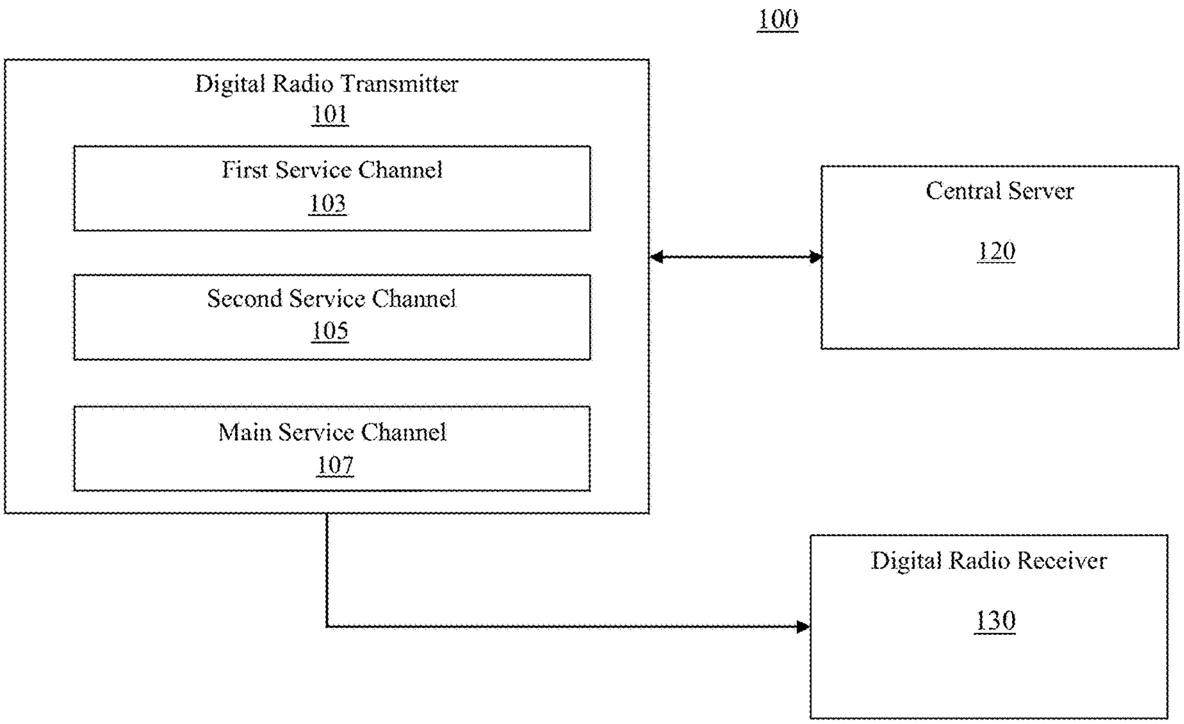

FIG. 2 shows the service channel data sync between digital radio stations
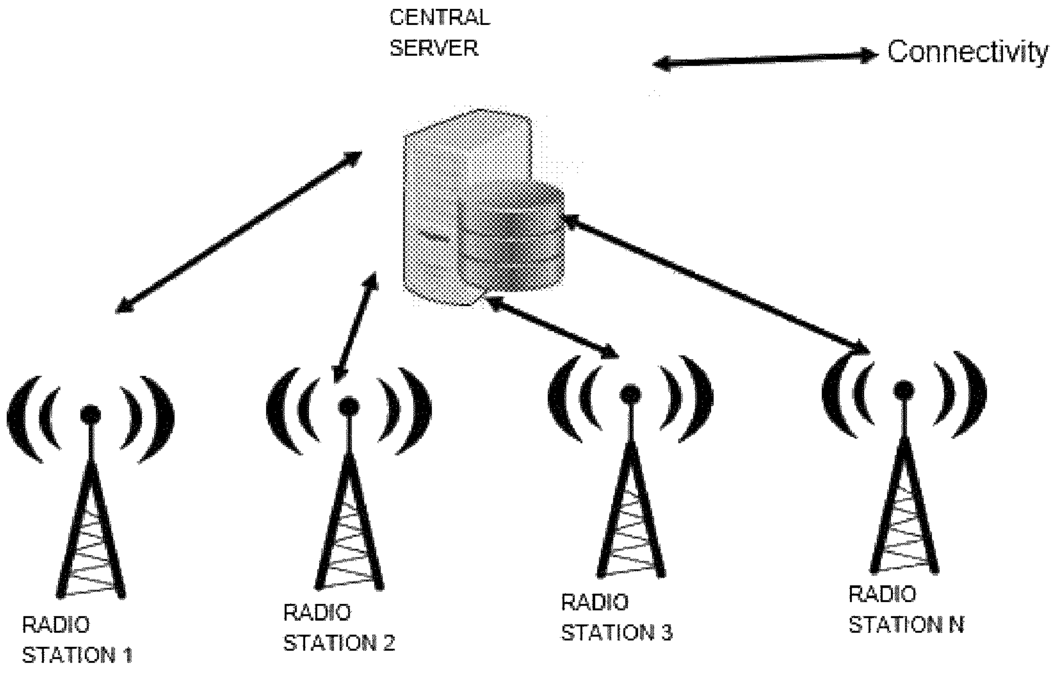

FIG. 3 shows the process flow for storage of service channels of other frequencies in the receiver.
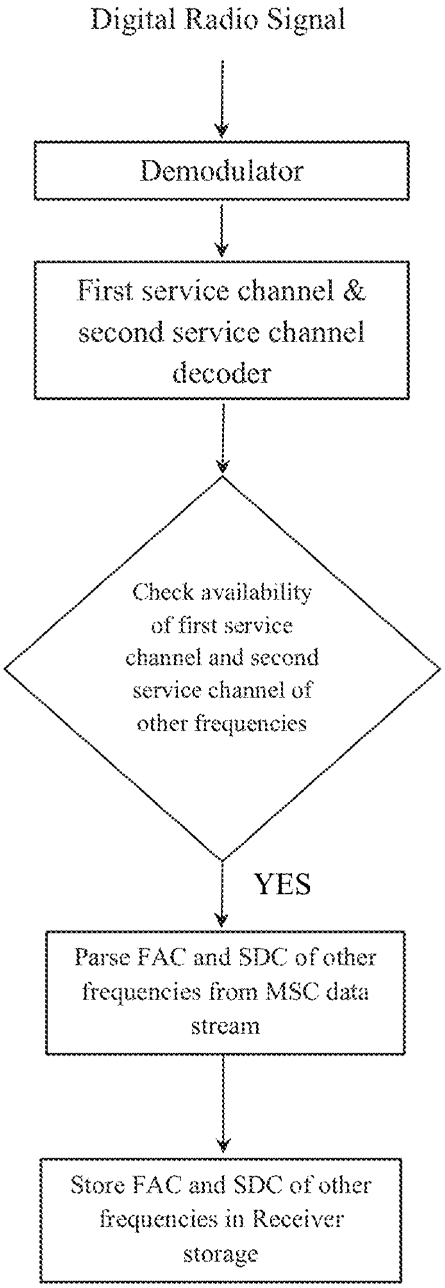

FIG. 4 represents how to retrieve first service channel and second service channel from storage to decode MSC in the receiver.
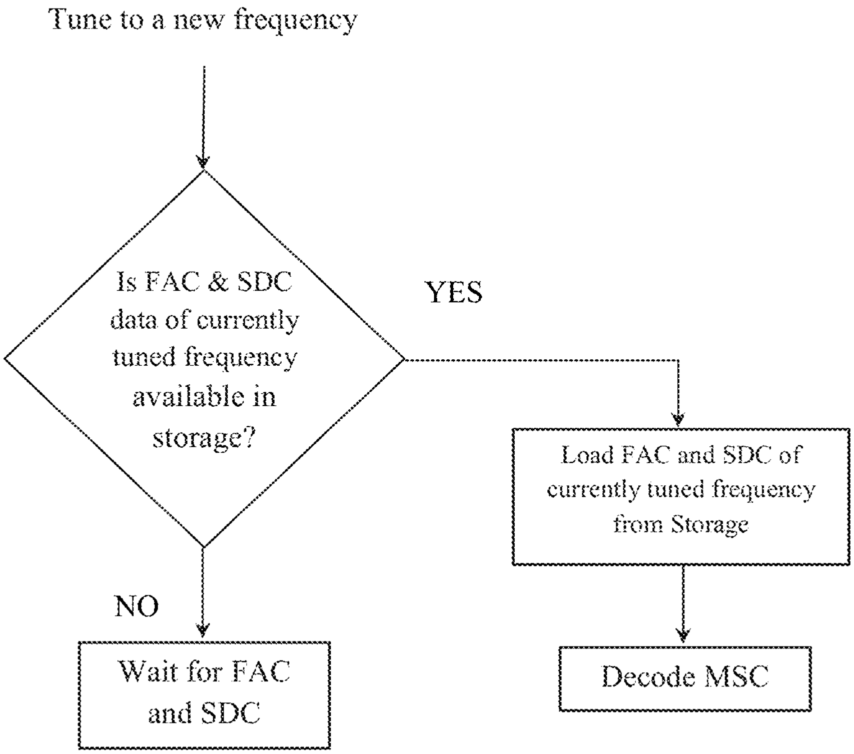

FIG. 5 depicts the improvements in playback starting by proposed solution.
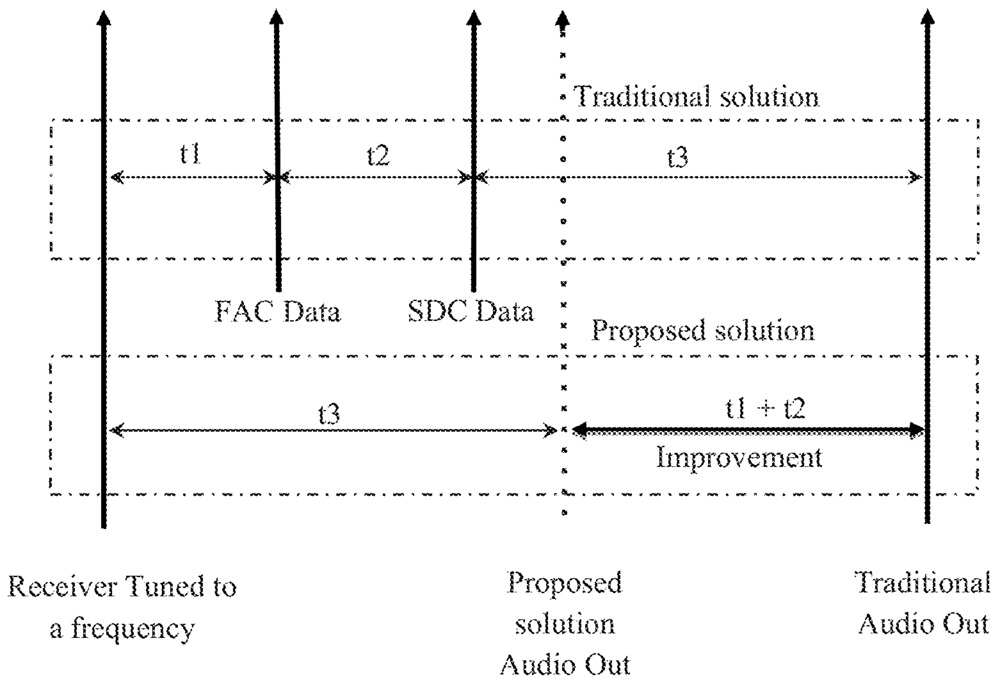

SYSTEM AND METHOD FOR REDUCING THE SERVICE SWITCHING TIME BETWEEN FREQUENCIES IN A DIGITAL RADIO

FIELD OF THE INVENTION

The present invention generally relates to digital radios. More particularly, the present invention relates to a system and method for enhancing user experience in the digital radios by reducing the service switching time between frequencies.

BACKGROUND

Digital radios use digital technology for transmission and reception of signals over the radio spectrum. Digital radios can be used in all frequency bands (AM and VHF). There are different Digital Radio broadcast standards namely Digital Radio Mondiale (DRM), Digital Audio Broadcasting (DAB), HD radio etc. Digital Radios are high quality digital replacement for analogue radio broadcasts in AM and VHF bands. In Digital Radio, multiple services are transmitted through single frequency.

The significant features of digital radios bring forth the high-quality digital replacement for analogue radio broadcasts in AM and VHF bands. Digital radios possess eminent features such as: providing good audio quality, supporting both audio and data, providing more number of services in a single frequency and supporting emergency warning system etc., One of the major discouraging factors of digital radios over analogue radios is the service switching time. The time taken for service switching in digital radios is higher than that of analogue radios. There are many prior art that deals with systems and methods for reducing the service switching time between frequencies. For example, U.S. Pat. No. 7,950,042 to Nabil Yousef entitled "Fast switching between time division multiplexed (TDM) channels" relates to a system and method for reducing a channel switching delay in a TDM mobile television systems. The transmitter sends a sequence of data bursts associated with channels to the receiver. The receiver buffers on the data bursts of channels stored in the internal memory and plays the channel when the user requests for a change.

U.S. Pat. No. 8,161,507 to Jae-Jin Shin et. al., entitled "Channel switching in a digital broadcasting system" relates to a channel switching apparatus and method in a digital broadcasting apparatus for reducing time. The transmitter sends channels to the receiver end through a physical channel. The receiver stores the received content of channel and plays the channel requested by the user.

Systems and methods in the existing art disclose the reduction in the channel switching time in digital radio broadcast system. The switching time is reduced by storing the all other channel information along with the requested channel information in the receiver device.

However, when information including data of other channels along with the requested channel is stored in a receiver device, receiver device requires more memory to store such data. Also, the broadcasting channel requires more bandwidth to accommodate such data as part of the transmission.

SUMMARY

Objective of the present invention is to enhance the user experience in a digital radio by reducing the service switching time between frequencies.

To achieve the above objective, the present invention discloses a system and method for enhancing the user experience in digital radio by reducing the service switching time between frequencies.

The system of the present invention comprises a digital radio transmitter to transmit digital data in a digital radio broadcast standard which includes a first service channel to carry basic service selection information, a second service channel to carry information required for decoding, a main service channel to transmit digital audio services and data services, a central server to store information channel data of all digital radio stations and a digital radio receiver to store the first service channel and the second service channel information of frequencies other than the currently tuned frequency to the receiver internal storage.

In one aspect, the first service channel is a fast access channel (FAC) of a Digital Radio Mondiale (DRM) digital radio broadcast standard and the second service channel is a service description channel (SDC) of the DRM broadcast standard.

According to the present invention, the method for enhancing the user experience in a digital radio by reducing the service switching time between frequencies, comprising: uploading first service channel and a second service channel information of all frequencies of all radio stations to a central server, storing the first service channel and second service channel information of all digital radio stations in the central server, fetching the service channel information updates by each radio station from the central server at desirable time slots or on notification from central server, sending the information channel data as part of a separate data service within the data channel of each frequency from the radio station to a digital radio receiver end, storing the information channel data of all frequencies by the receiver, using the stored channel data information for demodulating and decoding when the user tries to switch to another frequency.

The system and method of the present invention improves the service switching time of any service in any frequency from any station substantially by using the information channel parameters from memory rather than waiting to collect it from the live broadcast stream, demodulate, decode and parse the information channel parameters.

Objects of the invention are not limited to specific features or acts described in the description and drawings.

BRIEF DESCRIPTION OF THE DRAWINGS

The detailed description is set forth with reference to the accompanying figures.

FIG. 1 shows the block diagram of the system of the present invention;

FIG. 2 shows the service channel data sync between digital radio stations;

FIG. 3 shows the process flow for storage of channel information of other frequencies in the receiver;

FIG. 4 represents how to retrieve first service channel and second service channel from storage to decode MSC in the receiver; and FIG. 5 depicts the improvements in playback starting by proposed solution.

DETAILED DESCRIPTION OF THE INVENTION

The present invention provides a system and method for enhancing the user experience in digital radio by reducing the service switching time between frequencies.

The system for enhancing the user experience in digital radios, by reducing the service switching time between frequencies comprises a digital radio transmitter to transmit digital data in a digital radio broadcast standard that includes a first service channel, a second service channel and a main service channel. The system includes: a central server to store information channel data of all digital radio stations and a digital radio receiver to store the first service channel and the second service channel information of frequencies other than the currently tuned frequency to the receiver internal storage.

Referring to FIG. 1, the system (100) for enhancing user experience in a digital radio by reducing the service switching time between frequencies, comprises a digital radio transmitter (101) with a first service channel (103), a second service channel (105) and a main service channel (107), a central server (120) and a digital radio receiver (130). The digital radio transmitter (101) transmits digital data in a digital radio broadcast standard that includes the first service channel (103) to carry basic service selection information, a second service channel (105) to carry information required for decoding and a main service channel (107) to transmit digital audio services and data services. The central server (120) stores information channel data of all digital radio stations. A digital radio receiver (130) to store the first service channel (103) and the second service channel (105) information of frequencies other than the currently tuned frequency to the receiver internal storage.

The digital radio broadcast standards include but not limited to Digital Radio Mondiale (DRM), Digital Audio Broadcasting (DAB), HD radio etc.

In one aspect, the first and second service channel (103, 105) of the system is a fast access channel (FAC) and service description channel (SDC) respectively of a DRM broadcasting standard.

Accordingly, FAC contains basic service selection information for fast scanning and information on the channel parameters required for the demodulation of the multiplex. SDC contains information required for decoding MSC, attributes to the services within the multiplex and information about alternate frequency and emergency warning system. MSC is the major part of the transmission that contains digital audio services and data services. Thus, in case of DRM, the audio decoding starts only after receiving the FAC and SDC.

According to the present invention, the method for enhancing the user experience in a digital radio by reducing the service switching time between frequencies, comprising: uploading first service channel and a second service channel information of all frequencies of all radio stations to a central server, storing the first service channel and second service channel information of all digital radio stations in the central server, fetching the service channel information updates by each radio station from the central server at desirable time slots or on notification from central server, sending the information channel data as part of a separate data service within the data channel of each frequency from the radio station to a digital radio receiver end, storing the information channel data of all frequencies by the receiver, using the stored channel data information for demodulating and decoding when the user tries to switch to another frequency as shown in FIGS. 2 & 3.

According to the proposed solution, each digital radio frequency carries the first service channel (for example FAC in DRM) and second service channel information (for example, SDC in DRM) of frequencies other than the currently tuned frequency as a separate data stream. While playing to a digital radio service (frequency), digital radio receiver receives the first service channel and second service channel information of other frequency services in the currently tuned frequency itself. Digital radio receiver stores the first service channel and the second service channel information of frequencies other than the currently tuned frequency to the receiver internal storage as shown in FIG. 4.

In accordance with the present invention, when the user tries to switch to another frequency, radio receiver fetches the first service channel and second service channel information from the internal storage and will have all the required details for decoding audio and data services without waiting for the same from the received signal. This improves the service switching time substantially as shown in FIG. 5. In FIG. 5, t1 is the time taken for receiving FAC data after receiver tuned to a frequency, t2 is the time taken for receiving SDC data after receiving FAC data and t3 is the time taken for audio output after receiving SDC.

Following are the modifications to be done on the digital radio transmitter side:

The first service channel and the second service channel information of other frequencies are transmitted through the digital data services in the currently tuned frequency.

Availability of first service channel and second service channel information of other services (frequencies) in digital data services of currently tuned frequency can be indicated either in first service channel or in second service channel of the currently tuned frequency.

Availability of first service channel and second service channel information of other services (frequencies) in digital data services of currently tuned frequency can be indicated in both first service channel and second service channel of the currently tuned frequency.

Each radio station uploads the first service channel (for example FAC) and the second service channel (for example SDC) information to a central server for each of the frequencies in which its digital services are transmitted. Such information uploads use alternate communication mechanisms like broadband through a predefined data exchange schema (for example schemas defined by using xml, Json etc). Such upload of first service channel and second service channel information by radio stations will be either time based or if there is a change in previously uploaded FAC and SDC data. Central Server stores first service channel (for example FAC) and second service channel (for example SDC) of all digital radio stations in its storage. Each radio station fetches/downloads the service channel information updates from the central server at desirable time slots or if there is any update in any of the data available in the central server. If there is any update in any of the data stored, central server will notify all the radio stations.

Thus, the proposed solution improves the service switching time of any service in any frequency from any station substantially by using the information channel parameters from memory rather than waiting to collect it from the live broadcast stream, demodulate, decode and parse the information channel parameters.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding Indian application No. 201841044122, filed Nov. 22, 2018, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A system for enhancing user experience in a digital radio by reducing the service switching time between frequencies, the system comprising:

a. a digital radio transmitter to transmit digital data in a digital radio broadcast standard, wherein the digital radio broadcast standard is Digital Radio Mondiale (DRM), the digital radio transmitter comprises:
   i. a first service channel to carry basic service selection information;
   ii. a second service channel to carry information required for decoding; and
   iii. a main service channel to transmit digital audio services and data services including first and second channel information of a plurality of frequencies;

b. a central server to store information channel data of a plurality of digital radio stations; and c. a digital radio receiver to store the first service channel and the second service channel information of frequencies other than the currently tuned frequency to a receiver internal storage, wherein the receiver is configured to use the stored channel data information for demodulating and decoding when the receiver switches to another frequency, wherein each radio station of the plurality of digital radio stations is configured to upload service channel information updates to the central server.

2. The system as claimed in claim 1, wherein the first service channel is a fast access channel (FAC) and the second service channel is a service description channel (SDC) of the DRM broadcast standard.

3. The system as claimed in claim 1, wherein the radio station is configured to download the information of the first service channel and the second service channel from the central server based on a time.

4. A method for enhancing user experience in a digital radio by reducing the service switching time between frequencies, the method comprising:

a. uploading a first service channel information and a second service channel information of a plurality of frequencies of a plurality of digital radio stations to a central server;

b. storing the first service channel and second service channel information of the plurality of digital radio stations in the central server;

c. fetching or downloading service channel information updates by each radio station of the plurality of digital radio stations from the central server;

d. sending information channel data as part of a separate data service within the data channel of each frequency from the radio station to a digital radio receiver;

e. receiving and storing the information channel data of the plurality of frequencies by the receiver; and f. using the stored channel data information for demodulating and decoding when the user tries to switch to another frequency by the receiver.

5. The method as claimed in claim 4, wherein the digital radio broadcast standard is Digital Radio Mondiale (DRM).

6. The method as claimed in claim 4, wherein the first service channel is a fast access channel (FAC) and the second service channel is a service description channel (SDC) of the DRM broadcast standard.

7. The method as claimed in claim 4, wherein the uploading of information of the first service channel and the second service channel by the radio stations is time based.

8. The method as claimed in claim 4, wherein the uploading of information of the first service channel and the second service channel by the radio stations is due to a change in previously uploaded first service channel or second service channel data.

9. The method as claimed in claim 4, wherein the downloading of the information of the first service channel and the second service channel from the central server by the radio station is time based.

10. The method as claimed in claim 4, wherein the downloading of the information of the first service channel and the second service channel from the central server by the radio station is based on a notification from the central server.

11. A system for enhancing user experience in a digital radio by reducing the service switching time between frequencies, the system comprising:

a digital radio transmitter to transmit digital data in a digital radio broadcast standard, wherein the digital radio broadcast standard is Digital Radio Mondiale (DRM), the digital radio transmitter comprises:
   a first service channel to carry basic service selection information;
   a second service channel to carry information required for decoding; and
   a main service channel to transmit digital audio services and data services including first and second channel information of a plurality of frequencies;

a central server to store information channel data of a plurality of digital radio stations; and a digital radio receiver to store the first service channel and the second service channel information of frequencies other than the currently tuned frequency to a receiver internal storage, wherein the receiver is configured to use the stored channel data information for demodulating and decoding when the receiver switches to another frequency, wherein the radio station is configured to download the information of the first service channel and the second service channel based on a notification from the central server.

* * * * *